US006969252B2

(12) United States Patent
Nagafuji (10) Patent No.: US 6,969,252 B2
(45) Date of Patent: Nov. 29, 2005

(54) HEATING DEVICE HAVING RESIN LAYER OVER CORE METAL OF HEATING ROLLER

(75) Inventor: Hideo Nagafuji, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 77 days.

(21) Appl. No.: 10/704,548

(22) Filed: Nov. 12, 2003

(65) Prior Publication Data

US 2004/0126728 A1    Jul. 1, 2004

Related U.S. Application Data

(63) Continuation of application No. 09/995,563, filed on Nov. 29, 2001, now Pat. No. 6,701,120.

(30) Foreign Application Priority Data

Nov. 29, 2000   (JP)   ............................ 2000-362912

(51) Int. Cl.$^7$ .............................................. F27B 9/28
(52) U.S. Cl. ........................................ 432/60; 492/46
(58) Field of Search ........................... 432/60, 64, 228; 492/46, 17, 18; 219/216, 469, 543

(56) References Cited

U.S. PATENT DOCUMENTS

| | | | |
|---|---|---|---|
| 5,404,214 A | * | 4/1995 | Yoshimoto et al. ......... 399/329 |
| 6,101,363 A | * | 8/2000 | Tomatsu ..................... 399/330 |
| 6,463,252 B2 | * | 10/2002 | Omoto et al. ............... 399/330 |

* cited by examiner

Primary Examiner—Gregory Wilson
(74) Attorney, Agent, or Firm—Oblon, Spivak, McClelland, Maier & Neustadt, P.C.

(57) ABSTRACT

A heating device is used in an image forming apparatus. In the heating device, a resin layer is provided between a core metal of a fixing roller and a ball bearing. The resin layer is adhered to the core metal so as to obviate a noise, caused by a rubbing of the resin layer against a ball bearing, which is otherwise produced when the resin layer is provided as a separate part. Between the resin layer and the ball bearing, a material of the resin layer is selected and the resin layer is configured to have a rough surface with a coefficient of dynamic friction of the surface of the resin which is a predetermined value, and thereby minimizing the production of the noise.

13 Claims, 5 Drawing Sheets

CLEARANCE  IMAGE REGION

HEATING DEVICE HAVING RESIN LAYER OVER CORE METAL OF HEATING ROLLER

CROSS REFERENCE TO RELATED APPLICATION

This patent application claims priority to Japanese Patent Application No. 2000-362912, filed on Nov. 29, 2000, and the entire contents are incorporated by reference herein.

BACKGROUND OF THE INVENTION

1. Field of the Invention

The present invention relates to a heating device in which a heating roller heated at high temperature is brought into contact with a member to be heated, and more particularly to the heating device used in a fixing process of a toner image in an electrophotographic printing process and an image forming apparatus, such as a printer, a copier, etc., having the heating device in a fixing section thereof.

2. Discussion of the Background

In an electrophotographic printing process, an electrostatic latent image formed on a surface of a photoconductive element is developed with toner. The developed toner image is transferred onto a transfer sheet. Then a fixing process is performed to fix the toner image onto the transfer sheet. In the fixing process, the toner image is fixed onto the transfer sheet by at least heat and pressure. In a fixing device, the transfer sheet having the toner image is conveyed while being sandwiched by a fixing roller and a pressure roller. The fixing roller is heated to a high temperature. The pressure roller is driven while being press-contacted with the fixing roller. The toner image on the transfer sheet is then fixed while the transfer sheet is conveyed by the fixing roller.

In recent years, an attempt has been made to shorten a period of time required for a warm-up operation and to process an image at high speed in an image forming apparatus, in which an electrophotographic printing process is performed, such as a printer, a copier, etc. Corresponding to the above-described attempt, an attempt has been made to heat a fixing roller to higher temperature and convey a transfer sheet at higher speed in the fixing device. A resinoid sliding bearing, which is obtained at low cost, may be employed as a bearing of the fixing roller. However, a disadvantage to the sliding bearing is that a driving torque increases in the early stages of use and especially over the lapse of time, and that its durability decreases due to a deformation caused by a heat stress, when the fixing roller rotates at high speed.

Thus, an attempt has been made to use a ball bearing instead of the sliding bearing. The driving torque decreases when the ball bearing is used. A motor, which is smaller than that is used when the sliding bearing employed, is then used, resulting in a reduction in costs. Because the fixing roller is formed into a drum shape having a heater inside, it is advantageous that the fixing roller has a decreased thickness to shorten a period of time required for a warm-up operation. However, if the thickness of the fixing roller is decreased, a large amount of deformation appears. Thus, a wrinkle of a transfer sheet tends to occur.

To obviate the above-described inconvenience, a value of "thickness/outer diameter" of an image region (i.e., a central portion of the fixing roller through which a transfer sheet is conveyed) of the fixing roller needs to be in a predetermined range portion of the fixing roller, which is supported by a bearing provided to a main body of the apparatus, is smaller than that of the image region thereof.

When a ball bearing is employed to shorten a warm-up time and process an image at high speed, heat is conducted to the ball bearing if the ball bearing directly contacts a core metal of a fixing roller. Thus, the ball bearing is heated to high temperature, resulting in a decreased lifetime of the ball bearing. Further, during a warm-up operation, heat dissipates from the both ends of the fixing roller which are supported by the ball bearing. Thus, a temperature of the end portions of the fixing roller tends to decrease, resulting in a faulty fixing. Therefore, an insulating resin layer (i.e., a bush) or a ceramic member is provided between the fixing roller and the ball bearing to obviate the above-described behavior of heat, thereby preventing the above-described inconvenience. However, a noise is produced when the resin layer or ceramic member is rubbed against the core metal and ball bearing if the resin layer or ceramic member is conventionally provided as a separate part. The production of the noise may be reduced using a grease, however, a fluorine grease for a high-temperature is expensive. When the ceramic member is used, an insulating effect is enhanced, however, resulting not only in an increase in costs but in a further production of the noise.

The below-described problem needs to be solved when the ball bearing is adopted. As described above, the thickness of the fixing roller is determined such that the value of "thickness/outer diameter" of the image region is in the predetermined range. However, the thickness of the supported portion of the fixing roller needs to be adjusted based on the determined thickness of the image region of the fixing roller to obviate a deformation of the fixing roller and an occurrence of a wrinkle of a transfer sheet. Conventionally, an inner diameter of the supported portion of the fixing roller is set to a value equal to that of the inner diameter of the image region. Therefore, when a design change is made in the thickness of the supported portion, an outer diameter of the supported portion is eventually changed.

Thus, a general-purpose ball bearing is not used, and a customized ball bearing that fits to the modified outer diameter of the supported portion of the fixing roller is required. Conventionally, the outer diameter of the supported portion is smaller than that of the image region. The supported portion is then supported by a bearing provided to a main body of the apparatus. Thus, a replacement of the fixing roller with new one is not easily performed without dismantling a relating component.

SUMMARY OF THE INVENTION

The present invention has been made in view of the above-mentioned and other problems and addresses the above-discussed and other problems.

The present invention advantageously provides a novel image forming apparatus having a heating device used in a fixing operation of a toner image in an electrophotographic printing process, wherein a production a noise, caused by a rubbing of the resin layer (which is provided between a core metal of a fixing roller and a ball bearing to suppresses a conduction of heat from the fixing roller to the ball bearing) against the ball bearing and core metal of the fixing roller, is obviated.

According to an example of the present invention, when a clearance is created between the resin layer and the ball bearing, a material of the resin layer is selected and the resin layer is configured to have a rough surface so as to have a coefficient of dynamic friction of the resin surface in a predetermined value. A thickness of a supported portion of the fixing roller is detained based on a thickness of an image region of the fixings roller to prevent a deformation of the fixing roller. An inner diameter of the supported portion of the fixing roller is smaller than that of the image region so that an outer diameter of the supported portion of the fixing roller is not changed even if the thickness of the supported portion of the fixing roller is changed so that a general-purpose ball bearing is used.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
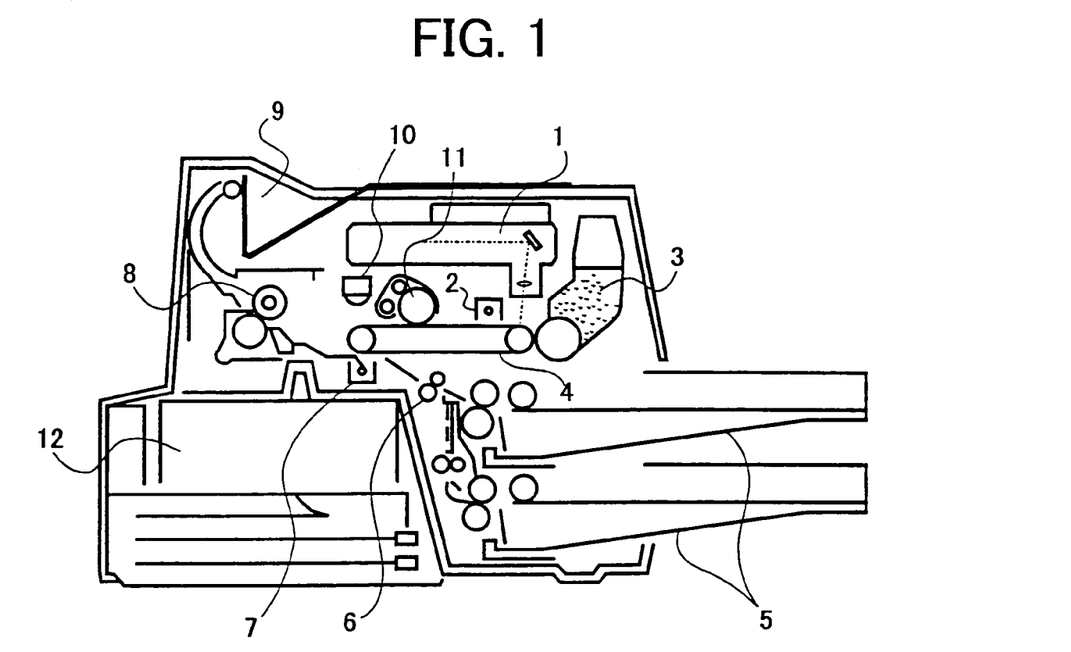
FIG. 1 is a schematic drawing illustrating a construction of a printer as an image forming apparatus.
Figure 2:
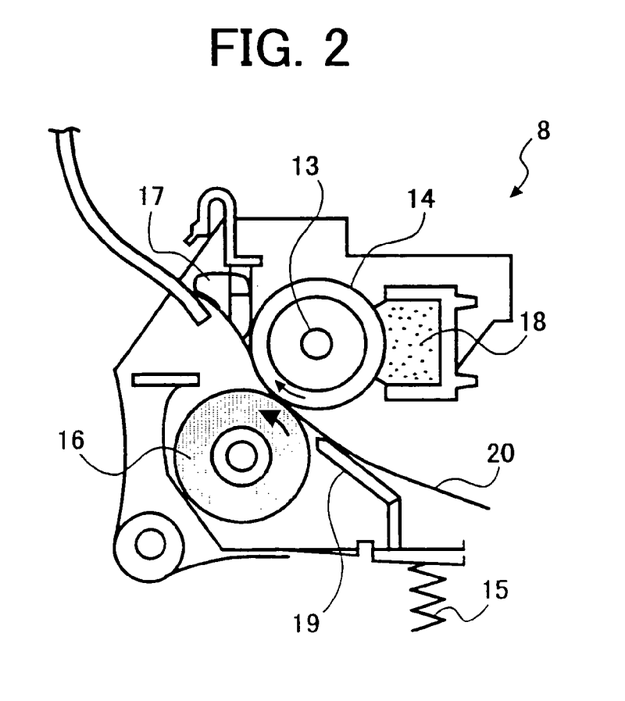
FIG. 2 is a schematic drawing illustrating a construction of a fixing device employed in the image forming apparatus in FIG. 1.

Referring now to the drawings, wherein like reference numerals designate identical or corresponding parts throughout the several views, FIG. 1 is a schematic drawing illustrating a construction of a printer as an image forming apparatus according to an example of the present invention. The image forming apparatus includes a fixing device which includes a heating device of the present invention. FIG. 2 is a schematic drawing illustrating a construction of the fixing device. Referring to FIG. 1, the construction and operation of the image forming apparatus is described below along a flow of a transfer sheet on which an image is formed. The transfer sheet fed from a sheet feeding device 5 is conveyed to a photoconductive element 4 (which is belt-shaped in this example) on a surface of which an image (i.e., an electrostatic latent image) is formed. The registration roller 6 conveys the transfer sheet by adjusting the time such that the transfer sheet is in precise register with the image formed on the surface of the photoconductive element 4. The photoconductive element 4 is driven in a clockwise direction. Devices performing a respective electrophotographic printing process are arranged along a run of the photoconductive element 4. The surface of the photoconductive element 4 is charged by a charger 2. A laser writing optical system 1 irradiates the surface of the charged photoconductive element 4 with a scanning beam modulated according to image data so as to form an electrostatic latent image thereon. The electrostatic latent image is developed into a visible image with toner by a developing device 3. The visible image is then transferred onto a transfer sheet by a transfer charger 7. The transfer sheet, which is brought into a press-contact with the photoconductive element 4 in a transfer process, is separated from the photoconductive element 4 at a curvature of the photoconductive element 4. The transfer sheet is then conveyed to a fixing device 8 so that the image is fixed. Thus, the transfer sheet is discharged to a sheet discharging tray 9. Residual charge remaining on the photoconductive element 4 is discharged by a discharging lamp 10. Residual toner remaining on the surface of the photoconductive element 4 is removed by a cleaning device 11. An AC (Alternative Current) and DC (Direct Current) power required for the above-described series of operations is supplied from a power source 12.

The fixing device 8 is described below in details. The fixing device 8 fixes a toner image, which has been transferred onto a transfer sheet from the photoconductive element 4 in an image transfer process, by applying at least heat and pressure. The fixing device 8 is heated to a high temperature. The fixing device 8 includes a fixing roller 14 (i.e., a heating roller) and a pressure roller 16. The fixing roller 14 rotatably drives and the pressure roller 16 is rotatably driven by the rotation of the fixing roller 14 while press-contacting with the fixing roller 14. The transfer sheet having the toner image is conveyed through a nip formed between the fixing roller 14 and pressure roller 16. Thus, the toner image is fixed onto the transfer sheet 20. As illustrated in FIG. 2, the fixing device 8 includes the fixing roller 14, the pressure roller 16, a cleaning pad 18, a switching pick 17, a pressure spring 15, and a fixing device inlet guide plate 19. The fixing device 8 further includes a gear (not shown) to drive the fixing roller 14, a bearing (not shown) for the fixing roller 14, and a thermistor (not shown).

Figure 3:
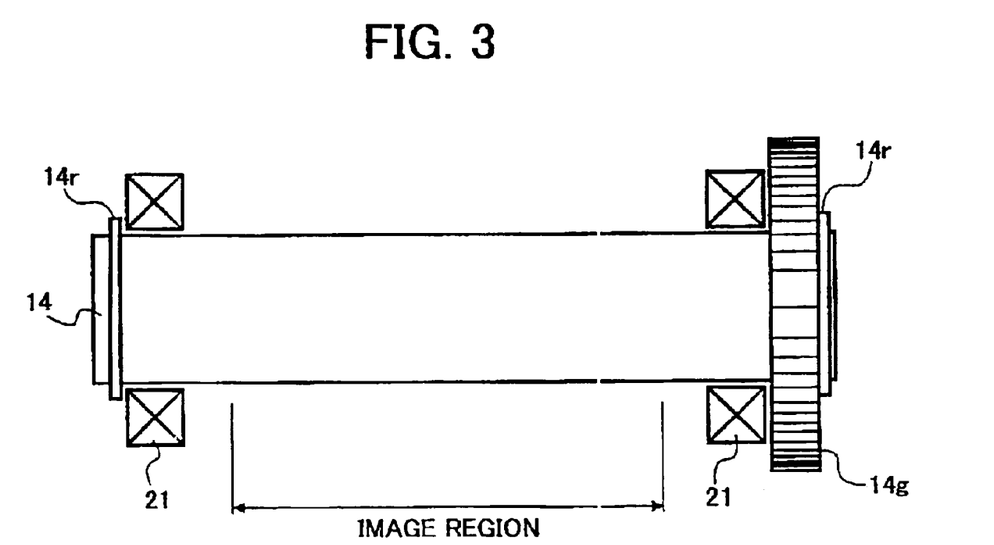
FIG. 3 is a schematic drawing illustrating a construction of a fixing roller as an example of a heating device.

The fixing roller 14 is employed in the heating device of the present invention. FIG. 3 is a schematic drawing illustrating a construction of the heating device. Both end portions of the fixing roller 14 are rotatably supported by a ball bearing 21. A driving gear 14g is provided to one end of the fixing roller 14 from outside of the ball bearing 21. The fixing roller 14 is driven via the driving gear 14g. A diameter of a portion of a circumferential surface of the fixing roller 14 which is supported by the ball bearing 21 (i.e., a supported portion) is equal to that of the circumferential surface of an image region thereof (i.e., a central portion of the fixing roller 14 through which a transfer sheet is conveyed). Namely, the diameter of the circumferential surface of the portion of the fixing roller 14 which is supported by the ball bearing 21 is not smaller than that of the circumferential surface of the fixing roller 14 of the image region, unlike a conventional fixing roller. Thus, the fixing roller 14 is pulled out in an axial direction by removing retaining rings 14r, which are provided approximately at both edges of the fixing roller 14 to regulate a movement of the fixing roller 14 in the axial direction. A replacement of the fixing roller 14 with new one is easily performed without removing parts provided to a main body of the apparatus, such as the ball bearing 21. The fixing roller 14 includes a core metal made of iron (i.e., STKM11, STKM12) or aluminum alloy having a diameter of 16 mm to 40 mm and a length of 350 mm to 410 mm. A degree of a deformation of the fixing roller 14, which is caused when a pressure is applied, differs according to a size of a diameter of the fixing roller 14 (i.e., the larger the diameter, the greater the degree of the deformation even if a thickness is the same). Therefore, a thickness of the fixing roller 14 is set to a value in a range of thickness/outer diameter from approximately 8/1000 to approximately 20/1000 (for example, the diameter is 30 mm, the thickness is 0.24 mm to 0.6 mm). It is preferable that the thickness is set in a range of approximately 8/1000 to approximately 14/1000 when the core metal is made of iron and when the core metal is made of aluminum alloy, the thickness is set in a range of approximately 10/1000 to approximately 20/1000. When the value of "thickness/outer diameter" is small, the degree of the deformation of the fixing roller 14 becomes great. Thus, a wrinkle of a transfer sheet tends to be generated. To the contrary, when the value of "thickness/outer diameter" is large, a comparatively long period of time is required before the fixing roller 14 is heated to a required temperature for a fixing operation, resulting in a longer warm-up time for the fixing operation.

The transfer sheet 20 is conveyed by a rotation of the fixing roller 14. In the example of the present invention, an explanation is given below based on a linear velocity of the conveyed transfer sheet 20 is in a range of about 100 mm/s to about 130 mm/s. The pressure roller 16 includes an elastic layer over a core substrate. The diameter of the pressure roller 16 is, for example, 30 mm. A thickness and length of the elastic layer is set to about 5.5 mm and about 316 mm, respectively. The elastic layer is either a sponge-formed or a solid-formed (i.e., non-sponge). The used fixing roller 14 includes a core metal made of iron (i.e., STKM12) having an outer diameter of 30 mm. A thickness of an image region of the fixing roller 14 is 0.3 mm. A value of "thickness/outer diameter" is 10/1000. Another used fixing roller includes the core metal made of aluminum alloy (i.e., A5052). The outer diameter is 30 mm and the thickness of the image region is 0.45 mm. The value of "thickness/outer diameter" is 15/1000. A length of the fixing roller 14 is 365 mm. According to the example, a warm-up time is shortened to 10 to 15 seconds when a heater 13 has 700 to 800 watts of power.

It is advantageous to use the ball bearing 21 as a bearing to support the fixing roller 14 when the fixing roller 14 is rotated at a high speed. When the fixing roller 14 rotating at a high speed is supported by a resin sliding bearing, a driving torque is increased in the early stages of use, and especially over the lapse of time. The driving torque is not significantly increased when the ball bearing 21 is used. In addition, a motor, which is smaller than that is employed when the resin sliding bearing is used, can be used because the driving torque is reduced, resulting in a reduction in costs. However, if a ball bearing directly contacts a core metal of a fixing roller, the inconvenience described in the section of "Discussion of the Background" is caused due to a conduction of heat. A resin layer (i.e., a resin member) is provided between the core metal of the fixing roller and the ball bearing for heat insulation. However, a noise is caused when the resin layer is rubbed against the core metal of the fixing roller or the ball bearing if the resin layer is provided as a separate part.

Figure 4A:
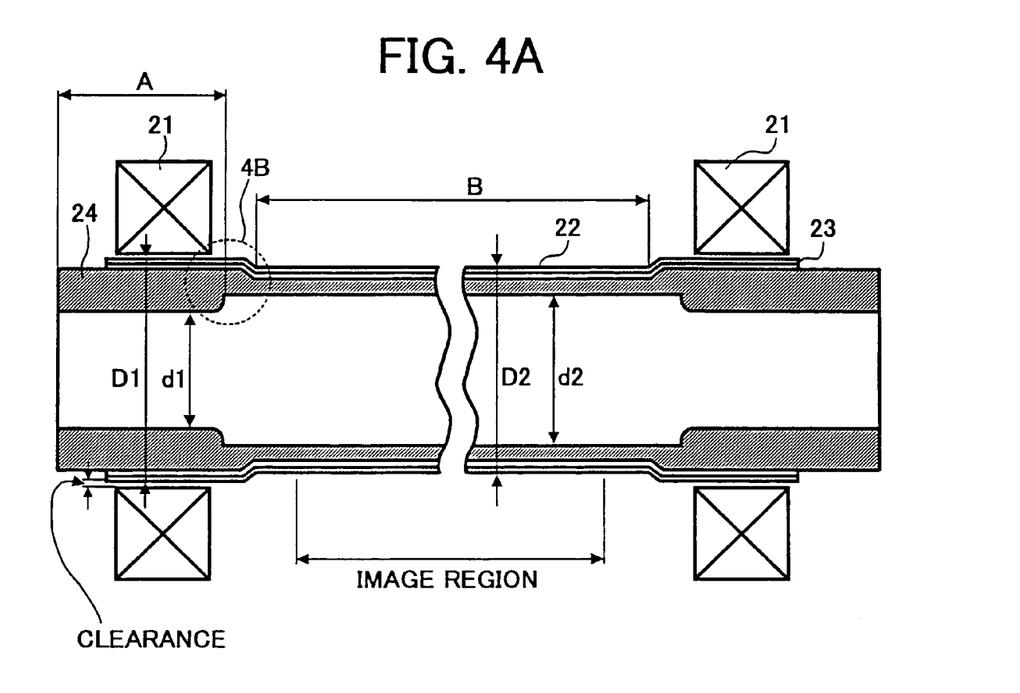
FIGS. 4A and 4B are drawings illustrating a sectional view of the fixing roller in which a resin layer is adhered to a core metal of the fixing roller.
Figure 4B:
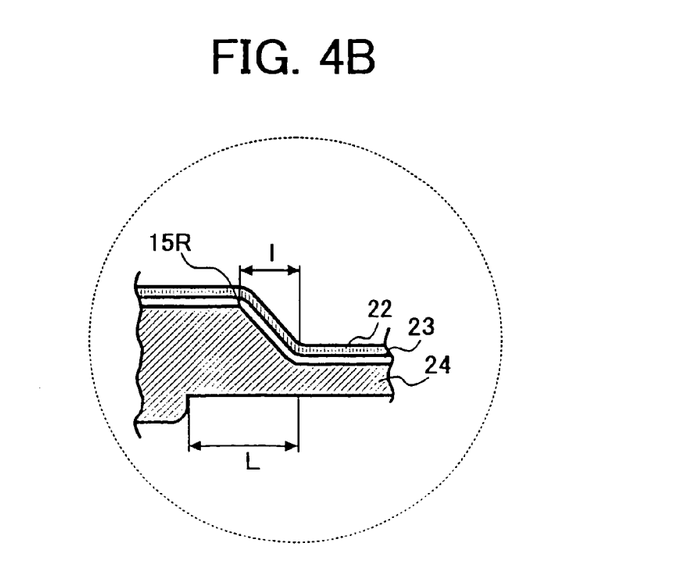
Figure 5:
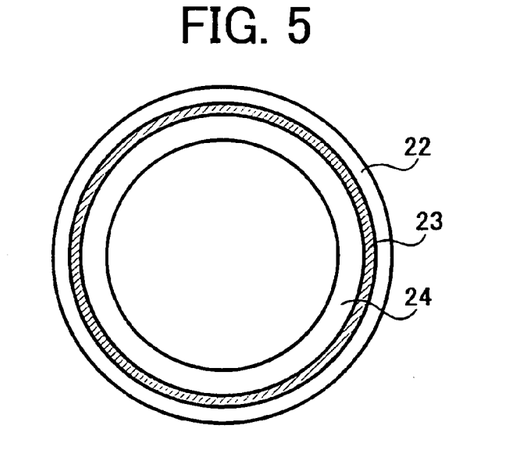
FIG. 5 is a drawing illustrating a transverse sectional view of the fixing roller in FIGS. 4A and 4B.

An example of a fixing roller, in which the rubbing noise caused by the resin layer provided between the core metal of the fixing roller and the ball bearing is eliminated, is described below. In this example, the resin layer is adhered to the core metal of the fixing roller such that the resin layer is not rubbed against the core metal of the fixing roller, thereby obviating a production of the noise. FIG. 4A is a drawing illustrating a vertical sectional view of the fixing roller 14 in which the resin layer 22 is adhered to the core metal 24 of the fixing roller 14. In FIG. 4A, both end portions of the fixing roller 14 are supported by a ball bearing 21. FIG. 4B is a drawing illustrating an enlarged view of a part of the fixing roller 14. The driving gear 14g illustrated in FIG. 3 is omitted in FIG. 4A. FIG. 5 is a drawing illustrating a transverse sectional view of the fixing roller 14. In the example illustrated in FIG. 4, an outer diameter of a portion of the fixing roller 14 which is supported by the ball bearing 21 is slightly larger than that of the image region of the fixing roller 14 by 0.2 mm to 0.6 mm. FIG. 4B is a drawing illustrating an enlarged view of a level difference formed in the portion of the fixing roller 14 where the diameter of the circumferential surface changes.

As illustrated in FIGS. 4A, 4B, and 5, a resin layer 22 is adhered to a core metal 24 via a primer layer 23. The resin layer 22 is layered on both portions of circumferential surfaces of the fixing roller, namely, the portion where the circumferential surface is supported by the ball bearing 21 (i.e., a supported portion) and the portion of the circumferential surface that is the image region. This is because the same surface layer (which has a necessary property (i.e., mainly release effect) for the surface that contacts a transfer sheet) as that is layered on the image region is layered on the circumferential surface of the supported portion of the fixing roller 14. However, a resin having a high insulative property may be layered only on the circumferential surface of the supported portion of the fixing roller 14.

Figure 6:
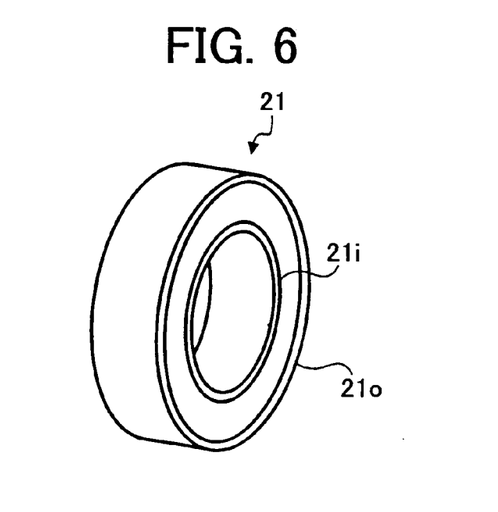
FIG. 6 is a drawing illustrating a perspective view of a ball bearing used in the example illustrated in FIGS. 4A and 4B.

Another example of the present invention is described below. In the example, a production of a noise caused by a rubbing of the resin layer 22 (which is constructed integrally with the core metal 24 of the fixing roller 14) against the ball bearing 21 is obviated. As illustrated in FIG. 4A, a clearance of 0.04 mm to 0.15 mm is created between the ball bearing 21 and the resin layer 22 because the fixing roller 14 expands with temperature. FIG. 6 is a drawing illustrating a perspective view of the ball bearing 21. As illustrated in FIG. 6, the ball bearing 21 includes an outer ring 21o and an inner ring 21i. The resin layer 22 of the fixing roller 14 may not be rubbed against the inner ring 21i of the ball bearing 21 because the outer ring 21o is fixed to a main body of the apparatus and the inner ring 21i rotates. However, a noise may be produced in fact because (1) the above-described clearance is created, and (2) the torque of the fixing roller 14 varies in a case where a transfer sheet is conveyed between the fixing roller 14 and the pressure roller 16, and in a case where no transfer sheet is conveyed therebetween. Then, a coefficient value that suppresses the production of the noise is examined while paying particular attention to a coefficient of dynamic friction of the surface of the resin layer 22. It is observed that the resin layer 22 smoothly slides over the inner ring 21i when the coefficient of dynamic friction of the resin layer 22 surface is set to 0.2 to 0.5 (when the fixing roller 14 moves at the speed of 50 mm/s having a load of 7Kgf/cm 2), thereby suppressing the production of the noise. Methods and materials to achieve a predetermined coefficient of dynamic friction are described below.

Figure 7:
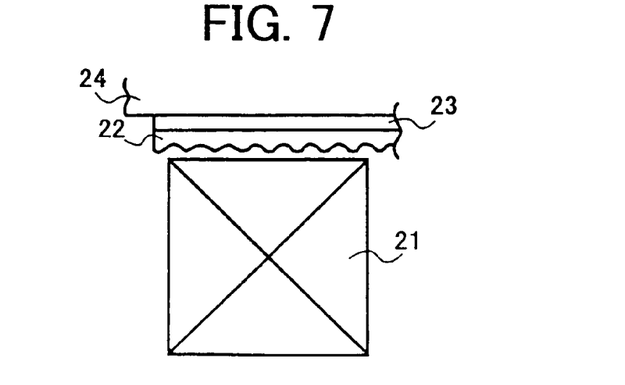
FIG. 7 is a drawing illustrating a vertical sectional view of the ball bearing and the resin layer that includes a rough surface.

As described above, a resin having a high insulative property may be layered only on the circumferential surface of the supported portion of the fixing roller 14. However, if the resin that is different from that layered on the image region is used, a cost is increased. Thus, the resin layer 22 including a fluororesin is integrally layered on both the image region and supported portion of the fixing roller 14. The fluororesin is layered mainly to have a release effect. This fluororesin layer 22 is adhered to the core metal 24 of the fixing roller 14 with the primer layer 23 (i.e., an adhesion layer). In a fluororesin, a material that has a coefficient of dynamic friction of 0.2 to 0.5 (when the fixing roller 14 moves at the speed of 50 mm/s having a load of 7Kgf/cm 2), such as a perfluoroalkoxy resin, tetrofluoroethylene resin, a mixture of these two resins, or resins produced by adding an additive or a reinforcement agent (such as carbon and glass fiber) to respective resins may be used. The surface of the resin layer 22 is made as rough as possible while the above-described coefficient of dynamic friction is maintained in a proper range. FIG. 7 is a drawing illustrating a vertical sectional view of the ball bearing 21 and the resin layer 22 that includes a rough surface. As illustrated in FIG. 7, the resin layer 22 has roughness on the surface that contacts the inner ring 21i of the ball bearing 21. The surface roughness (Rz) of the resin layer 22 is set to 3 to 12 $\mu$m. With this arrangement, an area of a contacting portion of the resin layer 22 (i.e., fluororesin) with the ball bearing 21 is reduced, thereby enhancing a insulation effectiveness. Further, the surface of the contacting portion of the resin layer 22 is not polished at all or is polished only once without having a finish polish, resulting in a reduction in costs.

As described above referring to FIGS. 4A and 4B, the outer diameter of the portion of the fixing roller 14 which is supported by the ball bearing 21 is larger than that of the image region, such that the fixing roller 14 is removed in the axial direction, thereby simplifying a replacement of the fixing roller 14 with new one. Thus, a level difference is formed between the supported portion and the image region in the circumferential surface of the fixing roller 14. If the level difference forms a right angle similar to a different level portion 14c illustrated in FIG. 8B, a polishing tape may be snagged on the different level portion 14c when polishing the surface of the fixing roller 14 with the polishing tape.

Figure 8A:
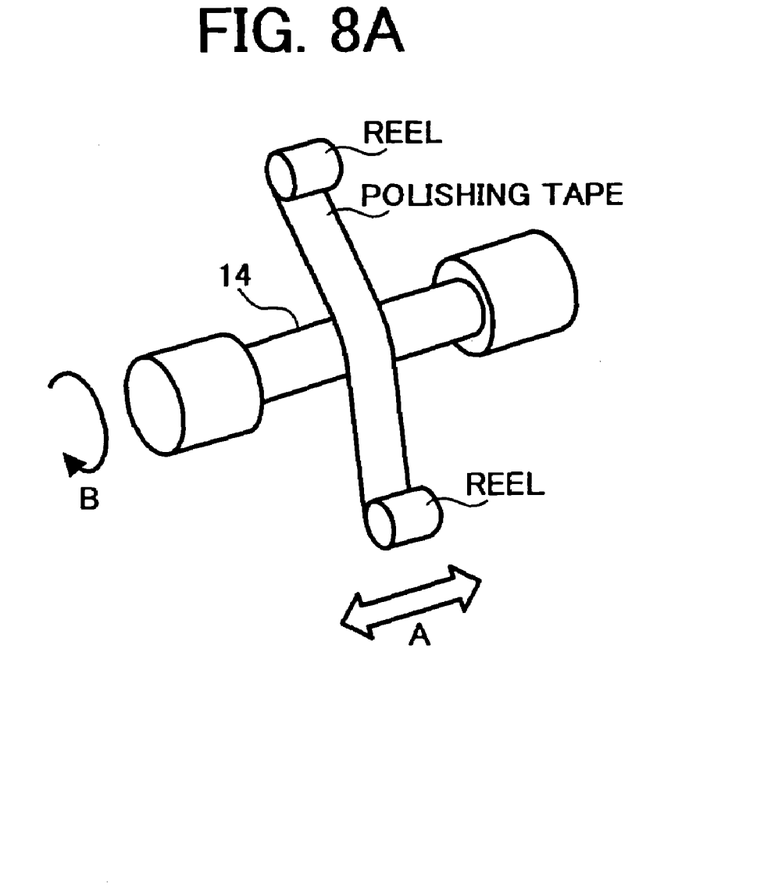
FIG. 8A is a drawing illustrating a polishing operation of the fixing roller 14.
Figure 8B:
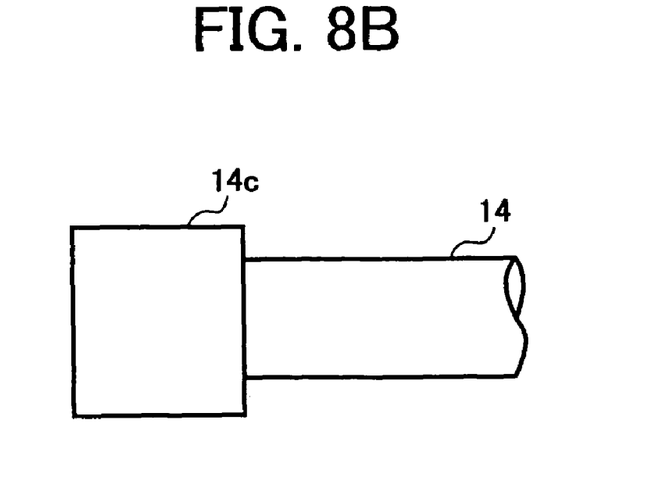
FIG. 8B is a drawing illustrating a fixing roller having a level difference portion that forms a right angle.

FIG. 8A is a drawing illustrating a polishing operation of the fixing roller 14. As illustrated in FIG. 8A, the polishing of the surface of the fixing roller 14 is performed by moving a reel of the polishing tape in a direction indicated by an arrow "A" while the polishing tape is brought into contact with the surface of the fixing roller 14 which rotates in a direction indicated by an arrow "B". In this polishing operation, an inconvenience, such as the polishing tape is snagged on the different level portion 14c or the fluororesin of the corner of the different level portion 14c is scraped may be caused. In order to avoid the above-described inconvenience, the different level portion is tapered instead of being formed having a right angle so that the polishing of the fixing roller 14 is easily performed using the polishing tape.

FIG. 4B shows the enlarged tapered different level portion. With the tapered different level portion, the scrape of the fluororesin is minimized. In addition, as illustrated in FIG. 4B, a corner of the tapered different level portion is configured to have a curve 15R having a radius of 0.5 mm to 1.5 mm, thereby obviating the scrape of the fluororesin of the corner of the different level portion.

As described above, an occurrence of a wrinkle of a transfer sheet in a fixing operation is prevented when a value of "thickness/outer diameter" is set to a predetermined range. However, if the value is applied to the supported portion of the fixing roller 14, the fixing roller 14 is deformed, thereby generating the wrinkle of the transfer sheet in the fixing operation.

Another example of the present invention is described. In the example, a proper value of a thickness of the supported portion of the fixing roller 14 is described. The proper value of the thickness of the supported portion of the fixing roller 14 is determined based on a thickness of the image region of the fixing roller 14. The value in a range of one and half to three times (i.e., 1.5 to 3 times) the thickness of the image region is selected as the value of the thickness of the supported portion. For example, when the thickness of the image region is 0.45 mm, the thickness of the supported portion is set to 0.9 mm to 1.0 mm.

When the above-described value is adopted, the deformation of the fixing roller 14 and the occurrence of the wrinkle of the transfer sheet in the fixing operation is prevented. In addition, the time required for a warm-up operation of the fixing roller 14 is shortened. An outer diameter of the image region is determined by a linear velocity of a transfer sheet and a composition of a gear that transmits a driving torque to the fixing roller 14. Thus, the thickness of the image region is consequentially decided to achieve a shortened warm-up time of the fixing roller 14. Then, an inner diameter of the core metal 24 of the image region is determined based on these values. However, if the proper value of thickness of the supported portion of the fixing roller 14 is decided based on the thickness of the image region thereof as described above, the outer diameter of the supported portion may be changed due to a design change in the thickness of the image region and the supported portion. Thus, it may happen that a general-purpose ball bearing (i.e., an inner diameter of a ball bearing is fixed) can not be used, and an expensive customized ball bearing is required. Hence, the inner diameter of the supported portion of the fixing roller 14 is made smaller than that of the image region thereof so that the outer diameter of the supported portion is not changed even if the thickness of the supported portion is changed. Then, the general-purpose ball bearing may be used because the outer diameter of the supported portion of the fixing roller 14 is not changed, thereby avoiding an increase in costs.

Considering the above-described conditions, a numerical value actually adopted to a fixing roller is described below, referring to FIGS. 4A and 4B. (The outer diameter of the supported portion "D1"—the outer diameter of the image region "D2")/2=0.1 mm to 0.3 mm. The length of the tapered different level portion in an axial direction "1"=0.5 mm to 2.0 mm. (The inner diameter of the image region "d2"—the inner diameter of the supported portion "d1")/2=0.3 mm to 0.5 mm. The length between the thick portion "A" and the thin portion "B" in the axial direction "L" is set to 1 mm to 3 mm such that the thickness does not steeply change in the direction of the length.

Obviously, numerous additional modifications and variations of the present invention are possible in light of the above teachings. It is therefore to be understood that within the scope of the appended claims, the present invention may be practiced otherwise than as specifically described herein.

What is claimed is:

1. A heating device, comprising:
   a heating roller configured to contact a heated member; and
   a ball bearing configured to support the heating roller,
   wherein a resin layer is adhesively provided to a surface of a supported portion of a core member of the heating roller which is supported by the ball bearing, the resin layer configured to suppress a production of a noise caused by the rubbing of the resin layer against the ball bearing, and wherein a roughness of a contact portion of a surface of the resin layer that contacts the ball bearing is set to a roughness predetermined value in which an insulating effect is enhanced, and
   wherein the heating roller is configured such that a first thickness of the supported portion differs from a second thickness of a portion of the heating roller that contacts the heated member.

2. The heating device according to claim 1, wherein the resin layer is disposed over a contacting portion of the core member with the heated member and the supported portion thereof.

3. The heating device according to claim 1, wherein an outer diameter of the supported portion of the heating roller is at least as large as an outer diameter of the portion of the heating roller contacting with the heated member.

4. A heating device comprising:
a heating roller configured to contact a heated member; and
a ball bearing configured to support the heating roller,
wherein a resin layer is adhesively provided to a surface of a supported portion of a core member of the heating roller which is supported by the ball bearing, the resin layer configured to suppress a production of a noise caused by the rubbing of the resin layer against the ball bearing, and wherein a roughness of a contact portion of a surface of the resin layer that contacts the ball bearing is set to a roughness predetermined value in which an insulating effect is enhanced, and
wherein a coefficient of dynamic friction of the surface of the resin layer is set to a friction predetermined value in which the production of the noise is suppressed.

5. A heating device comprising:
a heating roller configured to contact a heated member; and
a ball bearing configured to support the heating roller,
wherein a resin layer is adhesively provided to a surface of a supported portion of a core member of the heating roller which is supported by the ball bearing, the resin layer configured to suppress a production of a noise caused by the rubbing of the resin layer against the ball bearing, and wherein a roughness of a contact portion of a surface of the resin layer that contacts the ball bearing is set to a roughness predetermined value in which an insulating effect is enhanced, and
wherein the heating roller is configured such that a first thickness of the supported portion is larger than a second thickness of a portion of the heating roller that contacts the heated member.

6. The heating device according to claim 5, wherein the first thickness of the supported portion is determined such that an outer diameter of the supported portion is maintained in a thickness predetermined value when the first thickness of the supported portion is larger than the second thickness of the portion of the heating roller contacting with the heated member.

7. A method for obviating a production of a noise caused by a rubbing of a core member of a heating roller against a ball bearing that supports a supported portion of the heating roller in a heating device, the method comprising the steps of:
providing a resin layer on both an outer surface of the supported portion and a tapered portion, the tapered portion disposed between the outer surface of the supported portion and an outer surface of a contacting portion having a diameter less than a diameter of the outer surface of the supported portion.

8. A method for enhancing a replaceability of a heating roller in a heating device, the method comprising the steps of:
providing the heating roller including a contacting portion, a supported portion having an outer diameter larger than an outer diameter of the contacting portion, and a tapered portion disposed between the outer diameters of the contacting and supported portions; and
providing a ball bearing to support the supported portion of the heating roller.

9. A heating device comprising:
means for contacting a heated member comprising a contacting portion, a supported portion having an outer diameter larger than an outer diameter of the contacting portion, and a tapered portion disposed between the outer diameters of the contacting and supported portions;
means for supporting the contacting portion of the means for contacting; and
a resin layer provided to a surface of the supported portion.

10. The heating device according to claim 9, wherein a coefficient of dynamic friction of a surface of the resin layer is set to a friction predetermined value in which a production of noise caused by rubbing of the resin layer against the means for supporting is suppressed.

11. The heating device according to claim 9, wherein the resin layer is disposed over the contacting portion and the supported portion.

12. The heating device according to claim 9, wherein the means for contacting is configured such that a first thickness of the supported portion is larger than a second thickness of the contacting portion.

13. The heating device according to claim 12, wherein the first thickness of the supported portion is determined such that the outer diameter of the supported portion is maintained in a predetermined value.

* * * * *